(12) United States Patent
Chien et al.

(10) Patent No.: US 8,539,667 B2
(45) Date of Patent: Sep. 24, 2013

(54) METHOD OF FABRICATING TOUCH PANEL

(75) Inventors: Yu-Feng Chien, Taipei County (TW);
Zeng-De Chen, Yunlin County (TW);
Tun-Chun Yang, Taipei (TW);
Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 235 days.

(21) Appl. No.: 12/982,880

(22) Filed: Dec. 31, 2010

(65) Prior Publication Data
US 2012/0073124 A1 Mar. 29, 2012

(30) Foreign Application Priority Data
Sep. 24, 2010 (TW) .............................. 99132435 A

(51) Int. Cl.
*H01H 11/00* (2006.01)
*H01H 65/00* (2006.01)

(52) U.S. Cl.
USPC ................................. 29/622; 29/829; 29/831

(58) Field of Classification Search
USPC ........... 29/622, 825, 829, 831, 846; 345/173, 345/174; 430/313, 314, 318, 319
See application file for complete search history.

(56) References Cited

U.S. PATENT DOCUMENTS

| | | | |
|---|---|---|---|
| 2008/0007534 A1* | 1/2008 | Peng et al. ..................... | 345/173 |
| 2008/0277259 A1 | 11/2008 | Chang | |
| 2009/0002337 A1* | 1/2009 | Chang ........................... | 345/174 |
| 2010/0182272 A1* | 7/2010 | Kang et al. .................... | 345/174 |

FOREIGN PATENT DOCUMENTS

| | | |
|---|---|---|
| TW | 200844827 | 11/2008 |
| TW | 200901014 | 1/2009 |
| TW | M359752 | 6/2009 |

OTHER PUBLICATIONS

"Office Action of Taiwan Counterpart Application", issued on Jun. 27, 2013, pp. 1-10.

* cited by examiner

*Primary Examiner* — Thiem Phan
(74) *Attorney, Agent, or Firm* — Jianq Chyun IP Office

(57) ABSTRACT

A method of fabricating a touch panel is provided. A substrate having a touch-sensing region and a peripheral region is provided. A touch-sensing circuit layer including first sensing series, second meshed metal sensing pads, and peripheral circuits is formed on the touch-sensing region of the substrate. An insulating layer having first contact windows and second contact windows is formed on the substrate to cover the touch-sensing circuit layer. The first contact windows expose a portion of the second meshed metal sensing pads. A transparent conductive layer including second transparent bridge lines and transparent contact pads is formed on the insulating layer located in the touch-sensing region of the substrate. Each second transparent bridge line is electrically connected to two adjacent second meshed metal sensing pads through two first contact windows. Each transparent contact pad is electrically connected to the corresponding peripheral circuit through the second contact window.

10 Claims, 4 Drawing Sheets

METHOD OF FABRICATING TOUCH PANEL

CROSS-REFERENCE TO RELATED APPLICATION

This application claims the priority benefit of Taiwan application serial no. 99132435, filed on Sep. 24, 2010. The entirety the above-mentioned patent application is hereby incorporated by reference herein and made a part of specification.

BACKGROUND OF THE INVENTION

1. Field of the Invention

The invention relates generally to a method of fabricating a touch panel, and more particularly to a method of fabricating a capacitive touch panel.

2. Description of Related Art

Based on different ways of sensing, touch panels are generally categorized into resistant touch panels, capacitive touch panels, optical sensing touch panels, surface acoustic wave touch panels, and electromagnetic touch panels. The capacitive touch panels having advantages of excellent sensitivity, favorable reliability, and durability have been extensively applied in electronic devices.

Normally, the capacitive touch panel includes a plurality of first sensing series extending along a first direction and a plurality of second sensing series extending along a second direction. Each of the first sensing series includes a plurality of first sensing pads and a plurality of first bridge portions serially connected together, and each of the second sensing series includes a plurality of second sensing pads and a plurality of second bridge portions serially connected together. The first sensing pads and the second sensing pads together constitute a sensing array. When a user touches the touch panel with a finger, the first sensing series and the second sensing series of the touch panel cause a variation in capacitance on a position where the finger touches. The change of capacitance is transformed into a sensing signal, transmitted to a control circuit board, arithmetically processed, and thereby a proper instruction is output to operate the electronic device. Besides, the first sensing pads and the second sensing pads are made of indium tin oxide (ITO) in most cases, so as to enhance transmittance of the touch panel. However, overly high resistance of the ITO easily leads to low touch sensitivity of the touch panel. To resolve said issue, the first bridge portions or the second bridge portions are partially made of metallic materials instead of ITO according to the related art, and thereby the overly high resistance of the sensing series can be reduced.

The process of fabricating the touch panel is simplified in order to lower the manufacturing costs (e.g., fabrication of the uppermost insulating layer is omitted). However, given the uppermost insulating layer is not formed, the first bridge portions or the second bridge portions made of metallic materials are directly exposed to external surroundings, which easily results in metal oxidation and significant reduction of reliability and the life span of the touch panel. Additionally, if the contact pads that are located in the peripheral region of the touch panel and connected to external circuits are made of metallic materials, the metal contact pads, before being connected to the external circuits, are unavoidably exposed to the external surroundings directly, which is also likely to cause metal oxidation and significantly reduce the reliability and the life span of the touch panel.

Hence, how to reduce the resistance of the sensing series and prevent the metallic material from oxidizing without increasing the manufacturing costs are issues that need to be immediately resolved.

SUMMARY OF THE INVENTION

The invention is directed to a method of fabricating a touch panel. The method is suitable for reducing manufacturing costs and improving reliability of the touch panel.

The invention provides a method of fabricating a touch panel. The method includes following steps. A substrate is provided. The substrate has a touch-sensing region and a peripheral region. A touch-sensing circuit layer is formed on the touch-sensing region of the substrate. The touch-sensing circuit layer includes a plurality of first sensing series, a plurality of second meshed metal sensing pads, and a plurality of peripheral circuits. Each of the first sensing series includes a plurality of first meshed metal sensing pads and a plurality of first bridge lines. Each of the first bridge lines is respectively connected between two adjacent first meshed metal sensing pads. An insulating layer is formed on the substrate to cover the touch-sensing circuit layer. Here, the insulating layer has a plurality of first contact windows and a plurality of second contact windows. The first contact windows expose a portion of the second meshed metal sensing pads. A transparent conductive layer is formed on the insulating layer located in the touch-sensing region. The transparent conductive layer includes a plurality of second transparent bridge lines and a plurality of transparent contact pads. Each of the second transparent bridge lines is electrically connected to two adjacent second meshed metal sensing pads through two first contact windows. The second meshed metal sensing pads and the second transparent bridge lines together constitute a plurality of second sensing series. Each of the transparent contact pads is electrically connected to the corresponding peripheral circuit through the second contact window.

According to an embodiment of the invention, the substrate includes a glass substrate, a plastic substrate, a printed circuit board, or a display panel.

According to an embodiment of the invention, the insulating layer includes a transparent dielectric pattern layer and a frame pattern layer. The transparent dielectric pattern layer is located on the touch-sensing region of the substrate. The frame pattern layer is located on the peripheral region of the substrate.

According to an embodiment of the invention, a material of the frame pattern layer includes black resin or color resin.

According to an embodiment of the invention, a material of the transparent conductive layer includes indium tin oxide (ITO), indium zinc oxide (IZO), and aluminum zinc oxide (AZO).

According to an embodiment of the invention, each of the first meshed metal sensing pads includes a plurality of first bar-shaped metal patterns parallel to one another and a plurality of second bar-shaped metal patterns parallel to one another. The first bar-shaped metal patterns and the second bar-shaped metal patterns are intersected.

According to an embodiment of the invention, an extending direction of the first bridge lines is substantially perpendicular to an extending direction of the second transparent bridge lines, an extending direction of the first bar-shaped metal patterns is substantially parallel to the extending direction of the first bridge lines, and an extending direction of the second bar-shaped metal patterns is substantially parallel to the extending direction of the second transparent bridge lines.

According to an embodiment of the invention, an extending direction of the first bridge lines is substantially perpendicular to an extending direction of the second transparent bridge lines, an included angle between an extending direction of the first bar-shaped metal patterns and the extending direction of the first bridge lines is approximately 45 degrees, and an included angle between an extending direction of the second bar-shaped metal patterns and the extending direction of the first bridge lines is approximately 45 degrees.

According to an embodiment of the invention, a line width of each of the first bar-shaped metal patterns ranges from about 1 micrometer to about 6 micrometers, and a line width of each of the second bar-shaped metal patterns ranges from about 1 micrometer to about 6 micrometers.

According to an embodiment of the invention, the method further includes forming a plurality of dummy conductive patterns between the second meshed metal sensing pads and the first sensing series when the first sensing series and the second meshed metal sensing pads are formed. Here, the dummy conductive patterns are electrically floated.

The invention further provides a method of fabricating a touch panel. The method includes following steps. A substrate is provided. The substrate has a touch-sensing region and a peripheral region. A touch-sensing circuit layer is formed on the touch-sensing region of the substrate. The touch-sensing circuit layer includes a plurality of first sensing series and a plurality of second meshed metal sensing pads. Each of the first sensing series includes a plurality of first meshed metal sensing pads and a plurality of first bridge lines. Each of the first bridge lines is respectively connected between two adjacent first meshed metal sensing pads. An insulating layer is formed on the substrate to cover the touch-sensing circuit layer. Here, the insulating layer has a plurality of first contact windows that expose a portion of the second meshed metal sensing pads. A plurality of second transparent bridge lines are formed on the insulating layer located in the touch-sensing region. Each of the second transparent bridge lines is electrically connected to two adjacent second meshed metal sensing pads through two first contact windows. The second sensing pads and the second transparent bridge lines together constitute a plurality of second sensing series. The second transparent bridge lines completely cover the portion of the second meshed metal sensing pads exposed by the first contact windows.

According to an embodiment of the invention, the method further includes forming a plurality of peripheral circuits in the peripheral region of the substrate when the touch-sensing circuit layer is formed. The insulating layer further has a plurality of second contact windows exposing a portion of the peripheral circuits. The method further includes forming a plurality of conductive layers on the insulating layer located in the touch-sensing region when the second transparent bridge lines are formed, such that the conductive layers completely cover the portion of the peripheral circuits exposed by the second contact windows.

According to an embodiment of the invention, the substrate includes a glass substrate, a plastic substrate, a printed circuit board, or a display panel.

According to an embodiment of the invention, each of the first meshed metal sensing pads includes a plurality of first bar-shaped metal patterns parallel to one another and a plurality of second bar-shaped metal patterns parallel to one another. The first bar-shaped metal patterns and the second bar-shaped metal patterns are intersected.

According to an embodiment of the invention, an extending direction of the first bridge lines is substantially perpendicular to an extending direction of the second transparent bridge lines, an extending direction of the first bar-shaped metal patterns is substantially parallel to the extending direction of the first bridge lines, and an extending direction of the second bar-shaped metal patterns is substantially parallel to the extending direction of the second transparent bridge lines.

According to an embodiment of the invention, an extending direction of the first bridge lines is substantially perpendicular to an extending direction of the second transparent bridge lines, an included angle between an extending direction of the first bar-shaped metal patterns and the extending direction of the first bridge lines is approximately 45 degrees, and an included angle between an extending direction of the second bar-shaped metal patterns and the extending direction of the first bridge lines is approximately 45 degrees.

According to an embodiment of the invention, a line width of each of the first bar-shaped metal patterns ranges from about 1 micrometer to about 6 micrometers, and a line width of each of the second bar-shaped metal patterns ranges from about 1 micrometer to about 6 micrometers.

According to an embodiment of the invention, the method further includes forming a plurality of dummy conductive patterns between the second meshed metal sensing pads and the first sensing series when the first sensing series and the second meshed metal sensing pads are formed. Here, the dummy conductive patterns are electrically floated.

Based on the above, the touch-sensing circuit layer made of the metallic material, the insulating layer covering the touch-sensing circuit layer, and the transparent conductive layer located on the insulating layer are sequentially formed on the substrate in the invention. Hence, fabrication of the touch panel of the invention can prevent the metallic material from being exposed and then oxidizing according to the related art in order to improve reliability of the touch panel. Besides, the entire touch panel can be formed by only performing three manufacturing processes. Thereby, manufacturing steps and costs can be effectively reduced, and the touch panel of the invention is adapted to mass production.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
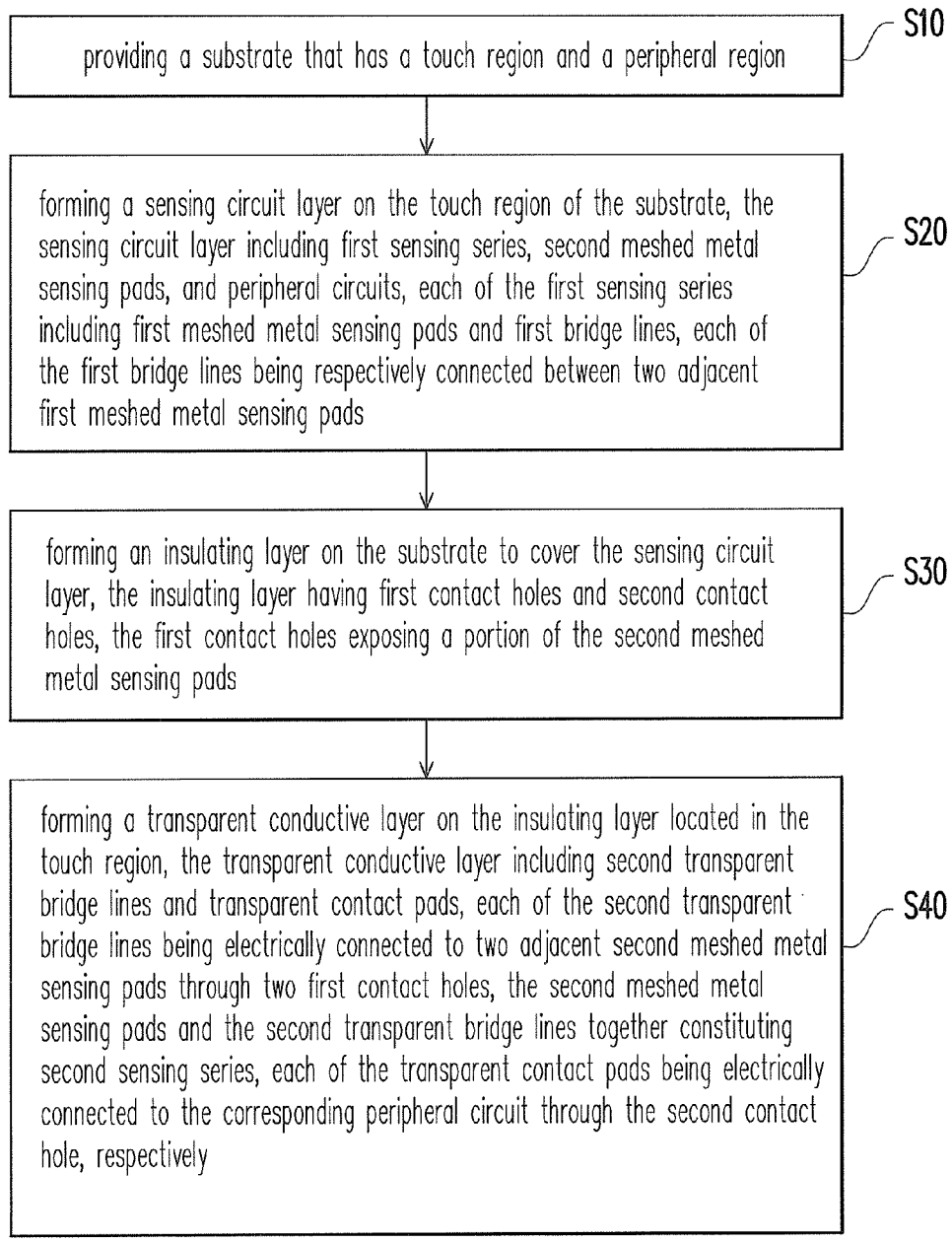
FIG. 1 is a flow chart of a method of fabricating a touch panel according to an embodiment of the invention.
Figure 2A:
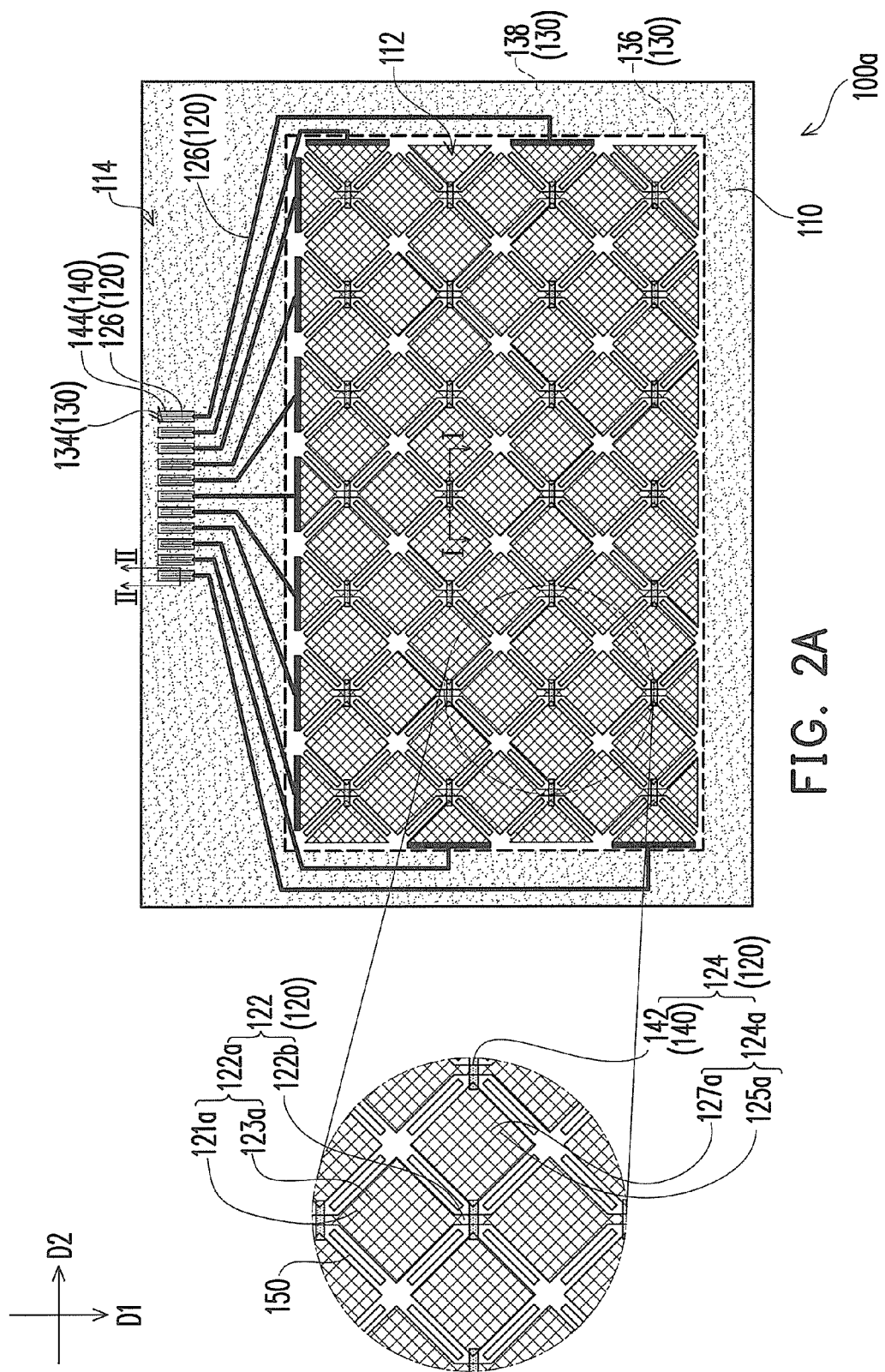
FIG. 2A is a schematic top view illustrating a touch panel according to an embodiment of the invention.
Figure 2B:
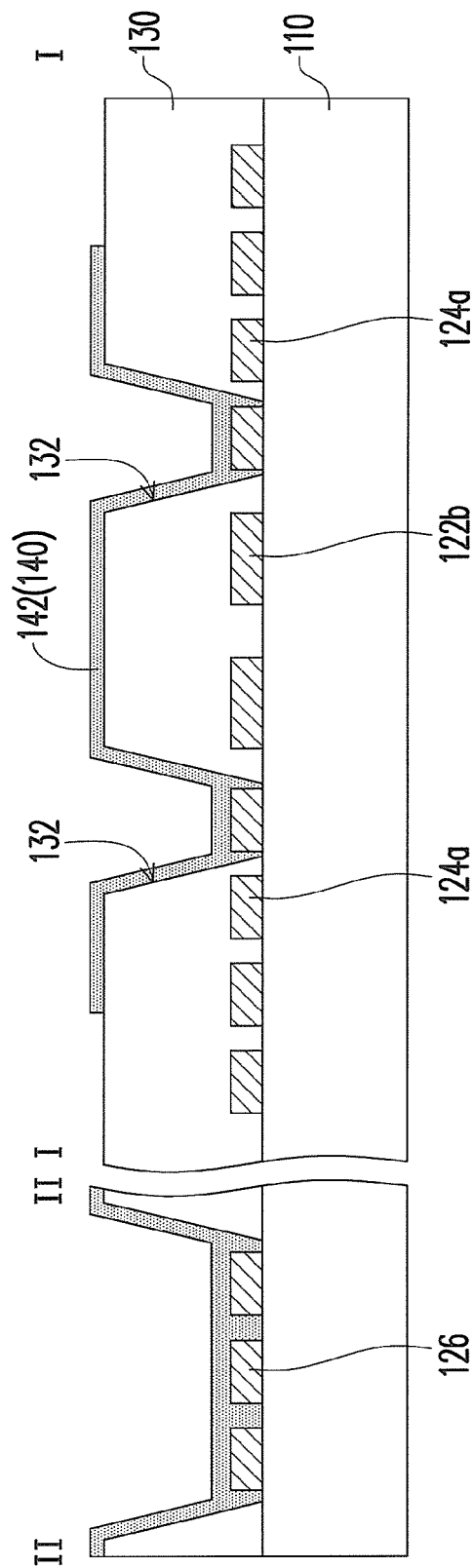
FIG. 2B is a schematic cross-sectional view taken along a line I-I in FIG. 2A.

FIG. 1 is a flow chart of a method of fabricating a touch panel according to an embodiment of the invention. FIG. 2A is a schematic top view illustrating a touch panel according to an embodiment of the invention. FIG. 2B is a schematic cross-sectional view taken along a line I-I in FIG. 2A. With reference to FIG. 1 and FIG. 2A, the method of fabricating the touch panel in this embodiment includes steps S10~S40. First, a substrate 110 is provided (step S10), and the substrate 110 has a touch-sensing region 112 and a peripheral region 114. In this embodiment, the substrate 110 is, for instance, a glass substrate, a plastic substrate, a printed circuit board, or a display panel.

With reference to FIG. 1 and FIG. 2A, a touch-sensing circuit layer 120 is formed on the touch-sensing region 112 of the substrate 110 (step S20). Specifically, the touch-sensing circuit layer 120 includes a plurality of first sensing series 122, a plurality of second meshed metal sensing pads 124a, and a plurality of peripheral circuits 126. The peripheral circuits 126 are electrically connected to the first sensing series 122, respectively. Each of the first sensing series 122 includes a plurality of first meshed metal sensing pads 122a and a plurality of first bridge lines 122b. Each of the first bridge lines 122b is respectively connected between two adjacent first meshed metal sensing pads 122a. As indicated in FIG. 2A, the first sensing series 122 of this embodiment extend along a first direction D1 and are disposed on the substrate 110, and the first sensing series 122 are electrically insulated from one another. The second meshed metal sensing pads 124a extend along a second direction D2 and are disposed on the substrate 110, and the second meshed metal sensing pads 124a are electrically insulated from one another. The second direction D2 and the first direction D1 are substantially intersected. In this embodiment, the first direction D1 and the second direction D2 can be substantially perpendicular to each other, while an included angle between the first direction D1 and the second direction D2 can be any degree other than 90 degrees in an alternative embodiment of the invention.

For instance, the meshed patterns of the first meshed metal sensing pads 122a and the second meshed metal sensing pads 124a can be meshed metal in any shape, such as regularly arranged triangles, squares, rhombuses, rectangles, hexagons, polygons, crosses, or other shapes. The meshed patterns can also be arranged in an irregular manner. According to this embodiment, the meshed metal sensing pads are in the square shape. Each of the first meshed metal sensing pads 122a includes a plurality of first bar-shaped metal patterns 121a parallel to one another and a plurality of second bar-shaped metal patterns 123a parallel to one another. The first bar-shaped metal patterns 121a and the second bar-shaped metal patterns 123a are intersected. To be more specific, in this embodiment, an included angle between an extending direction of the first bar-shaped metal patterns 121a and an extending direction of the first bridge lines 122b is about 45 degrees, for instance. An included angle between an extending direction of the second bar-shaped metal patterns 123a and the extending direction of the first bridge lines 122b is about 45 degrees, for instance. Besides, when the substrate 110 is a display panel, a line width of each of the first bar-shaped metal patterns 121a exemplarily ranges from about 1 micrometer to about 10 micrometers (preferably from about 1 micrometer to about 6 micrometers), and a line width of each of the second bar-shaped metal patterns 123a exemplarily ranges from about 1 micrometer to about 10 micrometers (preferably from about 1 micrometer to about 6 micrometers), such that the first bar-shaped metal patterns 121a and the second bar-shaped metal patterns 123a can be invisible. As clearly indicated in FIG. 2A, the first bar-shaped metal patterns 121a and the second bar-shaped metal patterns 123a are connected at the intersections of the first and the second bar-shaped metal patterns 121a and 123a.

In this embodiment, the shape of the second meshed metal sensing pads 124a is substantially the same as the shape of the first meshed metal sensing pads 122a. That is to say, each of the second meshed metal sensing pads 124a also includes a plurality of first bar-shaped metal patterns 125a parallel to one another and a plurality of second bar-shaped metal patterns 127a parallel to one another. The first bar-shaped metal patterns 125a and the second bar-shaped metal patterns 127a are intersected. To be more specific, in this embodiment, an included angle between an extending direction of the first bar-shaped metal patterns 125a and the extending direction of the first bridge lines 122b is about 45 degrees, for instance. An included angle between an extending direction of the second bar-shaped metal patterns 127a and the extending direction of the first bridge lines 122b is about 45 degrees, for instance. Besides, a line width of each of the first bar-shaped metal patterns 125a exemplarily ranges from about 1 micrometer to about 10 micrometers (preferably from about 1 micrometer to about 6 micrometers), and a line width of each of the second bar-shaped metal patterns 127a exemplarily ranges from about 1 micrometer to about 10 micrometers (preferably from about 1 micrometer to about 6 micrometers), such that the first bar-shaped metal patterns 125a and the second bar-shaped metal patterns 127a can be invisible. Similarly, as clearly indicated in FIG. 2A, the first bar-shaped metal patterns 125a and the second bar-shaped metal patterns 127a are connected at the intersections of the first and the second bar-shaped metal patterns 125a and 127a.

According to this embodiment, a plurality of dummy conductive patterns 150 can be selectively formed between the second meshed metal sensing pads 124a and the first sensing series 122 when the first sensing series 122 and the second meshed metal sensing pads 124a are formed. Here, the dummy conductive patterns 150 are electrically floated. Namely, the dummy conductive patterns 150, the first sensing series 122, and the second meshed metal sensing pads 124a are in the same film layer and are all made of metallic materials. The dummy conductive patterns 150 are formed to effectively eliminate a cross-talk effect between the first sensing series 122 and the second meshed metal sensing pads 124a, and thereby the touch sensitivity of the touch panel 100a can be improved.

With reference to FIG. 1, FIG. 2A, and FIG. 2B, in step S30, an insulating layer 130 is formed on the substrate 110 to cover the touch-sensing circuit layer 120. The insulating layer 130 has a plurality of first contact windows 132 and a plurality of second contact windows 134. The first contact windows 132 expose a portion of the second meshed metal sensing pads 124a. The insulating layer 130 can selectively include a transparent dielectric pattern layer 136. Particularly, in this embodiment, the insulating layer 130 can include the transparent dielectric pattern layer 136 and a frame pattern layer 138. The transparent dielectric pattern layer 136 is located on the touch-sensing region 112 of the substrate 110. The frame pattern layer 138 is located on the peripheral region 114 of the substrate 110. A material of the frame pattern layer 138 includes black resin or color resin, for instance.

As indicated in FIG. 1, FIG. 2A, and FIG. 2B, in step S40, a transparent conductive layer 140 is formed on the insulating layer 130 located in the touch-sensing region 112 of the substrate 110. To be more specific, the transparent conductive layer 140 of this embodiment includes a plurality of second transparent bridge lines 142 and a plurality of transparent contact pads 144. Each of the second transparent bridge lines 142 is electrically connected to two adjacent second meshed metal sensing pads 124a through two first contact windows 132. The second meshed metal sensing pads 124a and the second transparent bridge lines 142 together constitute a plurality of second sensing series 124. An extending direction of the first bridge lines 122b of the first sensing series 122 is substantially perpendicular to an extending direction of the second transparent bridge lines 142.

In this embodiment, the first bridge lines 122b are not in contact with the second transparent bridge lines 142, and the first bridge lines 122b are located below the second transparent bridge lines 142. In addition, each of the transparent contact pads 144 is electrically connected to the corresponding peripheral circuit 126 through the second contact window 134, respectively. The peripheral circuit 126 located below each transparent contact pad 144 can be a single metal wire, a plurality of metal wires, or a metal pad. A material of the transparent conductive layer 140 is, for instance, ITO, IZO, or AZO. In brief, the first bridge lines 122b and the second transparent bridge lines 142 of this embodiment are in different film layers. Namely, the first bridge lines 122b are made of metallic materials, and the second transparent bridge lines 142 are made of non-metallic materials, e.g., ITO, IZO, or AZO. So far, the touch panel 100a is formed. Since the touch-sensing circuit layer 120 of this embodiment has the meshed metal with low resistance, the conventional issue of low touch sensitivity caused by the overly high resistance can be resolved in the invention. Besides, the second transparent bridge lines 142 and the transparent contact pads 144 of this embodiment are made of transparent conductive metal oxide. Hence, even through the second transparent bridge lines 142 and the transparent contact pads 144 are exposed to the air for a long period of time, the conventional issue of the reduced resistance caused by naturally oxidized metal does not exist in this invention.

To sum up, the touch-sensing circuit layer 120 made of metallic materials is formed on the substrate 110, and the insulating layer 130 is foamed to cover the touch-sensing circuit layer 120 according to this embodiment. The transparent conductive layer 140 is then formed on a portion of the insulating layer 130, and the second transparent bridge lines 142 are electrically connected to two adjacent second meshed metal sensing pads 124a through the first contact windows 132 of the insulating layer 130. Thereby, the touch panel 100a of this embodiment is formed. In the aforesaid method, the touch-sensing circuit layer 120 is covered by the insulating layer 130 and the transparent conductive layer 140, and therefore the conventional issue of oxidized metallic materials caused by exposure to air can be prevented in this invention. Meanwhile, reliability and the life span of the touch panel 100a can be increased in this embodiment. Additionally, the touch panel 100a of this embodiment can be formed by only performing three photolithography processes and three etching processes. Hence, in comparison with the complicated processes of fabricating the conventional touch panel, the simplified processes of fabricating the touch panel 100a of this embodiment can effectively reduce manufacturing costs.

Figure 3:
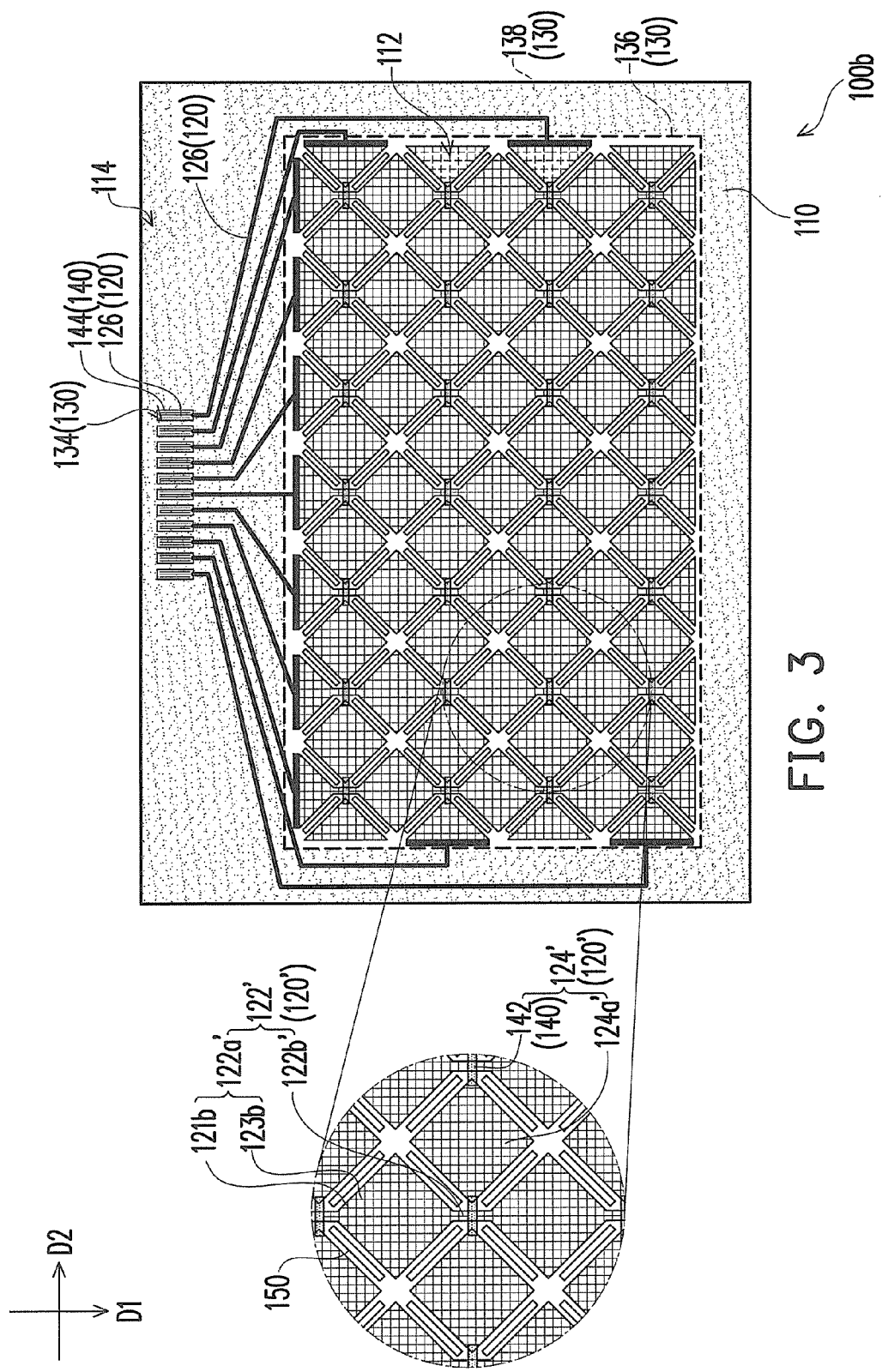
FIG. 3 is a schematic top view illustrating a touch panel according to another embodiment of the invention.

It should be mentioned that the invention is not limited to the square meshed metal patterns described above, and thus the extending directions of the first and the second bar-shaped metal patterns 121a and 123a are not restricted herein. Here, the included angle between the extending direction of the first bar-shaped metal patterns 121a and the extending direction of the first bridge lines 122b is about 45 degrees, and the included angle between the extending direction of the second bar-shaped metal patterns 123a and the extending direction of the first bridge lines 122b is about 45 degrees. However, in other embodiments of the invention, an extending direction of the first bar-shaped metal patterns 121b of the touch panel 100b can be substantially parallel to an extending direction of the first bridge lines 122b', and the extending direction of the second bar-shaped metal patterns 123b can be substantially parallel to an extending direction of the second transparent bridge lines 142, as shown in FIG. 3. In other words, the first meshed metal sensing pads 122a and the second meshed metal sensing pads 124a depicted in FIG. 2A are merely exemplary and are not intended to limit the invention.

In light of the foregoing, the method of fabricating the touch panel of the invention can prevent the metallic material from being exposed and then oxidizing, so as to improve reliability of the touch panel. Moreover, the entire touch panel can be formed by only performing three manufacturing processes. As such, manufacturing steps and costs can be effectively reduced.

It will be apparent to those skilled in the art that various modifications and variations can be made to the invention without departing from the scope or spirit of the invention. In view of the foregoing, it is intended that the invention cover modifications and variations of this invention provided they fall within the scope of the following claims and their equivalents.

What is claimed is:

1. A method of fabricating a touch panel, comprising:
providing a substrate having a touch-sensing region and a peripheral region;
forming a touch-sensing circuit layer on the touch-sensing region of the substrate, the touch-sensing circuit layer comprising a plurality of first sensing series, a plurality of second meshed metal sensing pads, and a plurality of peripheral circuits, each of the first sensing series comprising a plurality of first meshed metal sensing pads and a plurality of first bridge lines, each of the first bridge lines being connected between two adjacent first meshed metal sensing pads of the first meshed metal sensing pads;
forming an insulating layer on the substrate to cover the touch-sensing circuit layer, the insulating layer having a plurality of first contact windows and a plurality of second contact windows, the first contact windows exposing a portion of the second meshed metal sensing pads; and
forming a transparent conductive layer on the insulating layer located in the touch-sensing region of the substrate, the transparent conductive layer comprising a plurality of second transparent bridge lines and a plurality of transparent contact pads, each of the second transparent bridge lines being electrically connected to two adjacent second meshed metal sensing pads of the second meshed metal sensing pads through two of the first contact windows, the second meshed metal sensing pads and the second transparent bridge lines constituting a plurality of second sensing series, each of the transparent contact pads being electrically connected to a corresponding one of the peripheral circuits through one of the second contact windows.

2. The method as claimed in claim 1, wherein the substrate comprises a glass substrate, a plastic substrate, a printed circuit board, or a display panel.

3. The method as claimed in claim 1, wherein the insulating layer comprises a transparent dielectric pattern layer and a frame pattern layer, the transparent dielectric pattern layer is located on the touch-sensing region of the substrate, and the frame pattern layer is located on the peripheral region of the substrate.

4. The method as claimed in claim 3, wherein a material of the frame pattern layer comprises black resin or color resin.

5. The method as claimed in claim 1, wherein a material of the transparent conductive layer comprises indium tin oxide, indium zinc oxide, and aluminum zinc oxide.

6. The method as claimed in claim 1, wherein each of the first meshed metal sensing pads comprises a plurality of first bar-shaped metal patterns parallel to one another and a plurality of second bar-shaped metal patterns parallel to one another, and the first bar-shaped metal patterns and the second bar-shaped metal patterns are intersected.

7. The method as claimed in claim 6, wherein an extending direction of the first bridge lines is substantially perpendicular to an extending direction of the second transparent bridge lines, an extending direction of the first bar-shaped metal patterns is substantially parallel to the extending direction of the first bridge lines, and an extending direction of the second bar-shaped metal patterns is substantially parallel to the extending direction of the second transparent bridge lines.

8. The method as claimed in claim 6, wherein an extending direction of the first bridge lines is substantially perpendicular to an extending direction of the second transparent bridge lines, an included angle between an extending direction of the first bar-shaped metal patterns and the extending direction of the first bridge lines is approximately 45 degrees, and an included angle between an extending direction of the second bar-shaped metal patterns and the extending direction of the first bridge lines is approximately 45 degrees.

9. The method as claimed in claim 6, wherein a line width of each of the first bar-shaped metal patterns ranges from about 1 micrometer to about 6 micrometers, and a line width of each of the second bar-shaped metal patterns ranges from about 1 micrometer to about 6 micrometers.

10. The method as claimed in claim 1, further comprising forming a plurality of dummy conductive patterns between the second meshed metal sensing pads and the first sensing series when the first sensing series and the second meshed metal sensing pads are formed, wherein the dummy conductive patterns are electrically floated.

\* \* \* \* \*